United States Patent [19]
Kopernicky

[11] 3,883,057
[45] May 13, 1975

[54] STOP-GO FILM ADVANCE MEANS
[75] Inventor: Jaroslav Kopernicky, Mississauga, Ontario, Canada
[73] Assignee: MRM Industries, Inc., Skokie, Ill.
[22] Filed: Oct. 30, 1972
[21] Appl. No.: 302,014

[52] U.S. Cl. .................. 226/36; 226/52; 226/76; 226/114; 352/159
[51] Int. Cl. ............................................ G03b 1/28
[58] Field of Search ........ 352/159, 185; 226/76, 52, 226/113, 55, 114, 36, 24, 39, 86, 118

[56] References Cited
UNITED STATES PATENTS
| | | | |
|---|---|---|---|
| 1,308,984 | 7/1919 | Evans | 226/114 |
| 3,065,890 | 11/1962 | Fox | 226/114 X |
| 3,469,752 | 9/1969 | Amos et al. | 226/113 X |

Primary Examiner—Lloyd L. King
Assistant Examiner—Gene A. Church

[57] ABSTRACT

A film transport system for moving film past a display area. The transport system includes means for generating a tension force in a segment of the film, after a film frame portion is locked in place, for projecting the picture information thereon. Means responsive to such tension, to automatically advance the film frame by frame, in a stop and go sequence past the display area.

31 Claims, 10 Drawing Figures

STOP-GO FILM ADVANCE MEANS

BACKGROUND OF THE INVENTION

This invention relates generally to a film transport system for advancing film past a display area, and more particularly relates to a control means for advancing film, frame by frame, in a stop and go sequence across a display area. Still more specifically, the subject invention relates to an editing table including film transport means for advancing the film in a stop and go sequence.

Prior to the subject invention, film projectors commonly employed an automatic four step sequence for advancing film past a display area. A claw or pin engaged the film by extending outward in a horizontal direction through a perforation in the film and then the claw pulled the film vertically downward a distance of one frame, to position the next trailing frame across the display area. Thereafter, the claw dis-engaged from the film by retracting horizontally out from the perforation; and finally the claw moved vertically upward to return to its original position, to commence the next film advance sequence. Generally, the horizontal and vertical claw movements were controlled respectively by separate cams.

During the time that the claw dis-engaged from the film to return to its original position, the film portion being projected had a tendency to flutter and vibrate. This would cause some distortion or a decrease in sharpness of the displayed picture. To overcome this, some of these type projectors included a second claw to engage the film after the first claw dis-engaged.

Furthermore, due to the requirement of four steps per frame, these prior projectors were limited in the number of frames that could be projected per unit of time. Usually, such projectors advanced at a speed of 18 to 24 frames per second (1,080 to 1,440 frames per minute).

For the more sophisticated and expensive projectors used in editing tables, a rotating prism having a plurality of flat sides was generally used. The prism rotated in synchronization with the moving film, and caused the film to be projected frame by frame, as a different side of the rotating prism was positioned in an opposed parallel relationship with the frame appearing at that instant across the display area. The film frame at the display area did not stop moving during the time it was being projected, since the rotating prism tracking the moving film provided the continuity of picture for the viewer. To increase the rate of projection of the picture frames, the film speed and the rotational speed of the prism were increased. To improve the quality of the displayed picture, the number of sides of the prism was required to be increased. This substantially increased the cost of the editing table.

The invention herein provides a simplified film transport system for advancing the film frame by frame, across a display area. Each film frame is positively registered in place when it is being projected. The rate of projecting the frames may be incrementally increased or decreased. The picture frames may be projected at a substantially greater rate than 24 frames per second. No expensive prism is used in the subject system.

Accordingly, it is a primary object of this invention, to provide a film advance means for controlling the sequence of film movement across a picture display area, as the film continually moves between a feed reel and a take-up reel.

Another object is to provide a film advance means to always project a single frame at any one instant, and to include means to prevent display of part of one frame and part of another frame.

Another object is to provide means for positive control of the frame by frame film movement, so that the film may be edited at the exact desired location.

Another object is to provide means whereby the speed of film movement determines the rate the picture frames are displayed on an external surface.

Still another object is to provide means for incrementally varying the rate the film frames are projected onto a screen.

Another object is to lock the picture frame in a substantially immovable position when being projected.

Another object is to provide a film projector, that does not require an adjustment for frame height in order to register a single frame in place.

BRIEF DESCRIPTION OF THE DRAWINGS

Referring to the drawings in which the same characters of reference are employed to indicate corresponding similar parts throughout the several figures of the drawings.

DESCRIPTION OF THE PREFERRED EMBODIMENT

Figure 1:
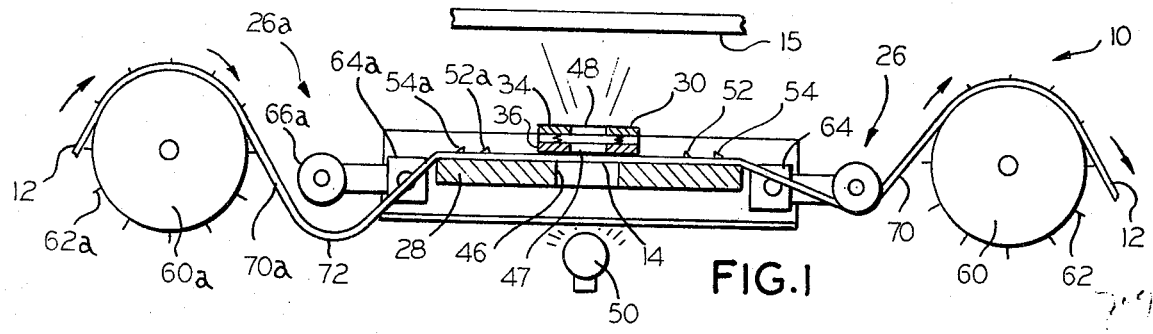
FIG. 1 is a diagramatic view of a film advance means for advancing the film in a forward direction, and showing the film locked in place across the display area, and embodying the principles of the invention.

Referring now to the several Figures of the drawings, the reference numeral 10 indicates generally a film tape transport system for moving tape 12 past a display area 14, where the picture information is projected onto a screen or surface 15.

The tape 12 includes perforations 16 spaced longitudinally adjacent the film edge 18. Film tape 12 may be of the 16 millimeters or 8 millimeter type film. For film tape having a greater width, a second set of perforations may also extend along the opposite edge 19. The space 20 between two adjacent perforations 16 corresponds to a single frame. Thus, each film movement of one space 20 advances the film 12 in either a forward or reverse direction.

Figure 4:
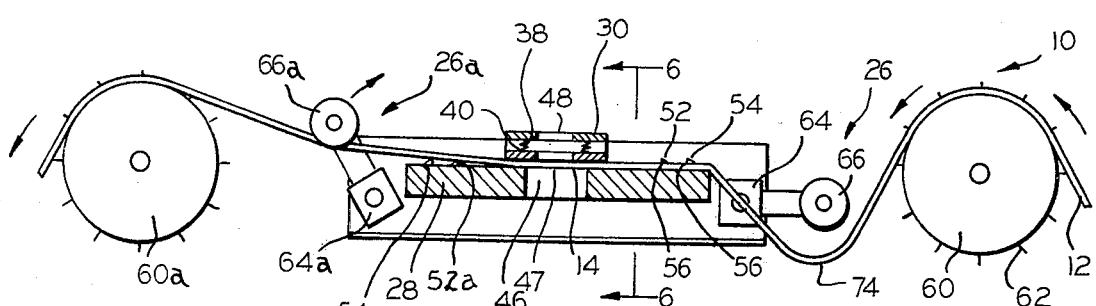
FIG. 4 is a diagramatic view similar to FIG. 2, but showing the film moving in the opposite direction and illustrating the film being released for advancing the next picture frame in the reverse direction to the display area.
Figure 10:
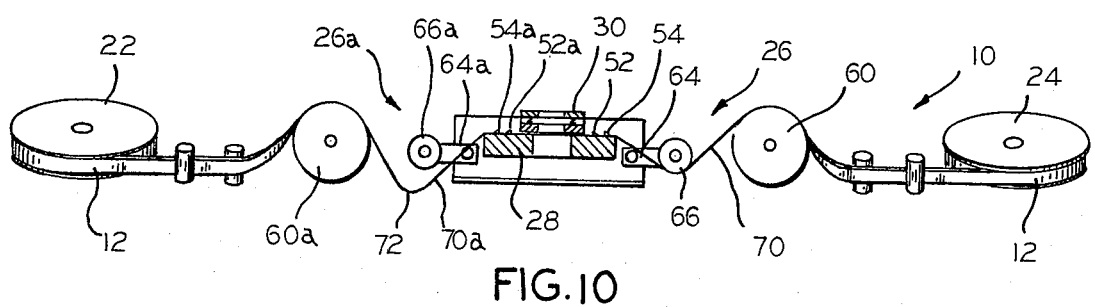
FIG. 10 is a diagramatic view of the film transport system.

The film 12 moves between a feed or supply reel 22 and a take-up reel 24 (FIG. 10). A forward film advance means indicated generally by the reference numeral 26 advances the film in a forward direction as viewed in FIG. 1, frame by frame in a stop and go sequence past the display area 14 and toward the take-up reel 24. Similarly, a reverse film advance means indicated generally by the reference numeral 26, and a suffix "a," advances the film in a reverse direction as viewed in FIG. 4 frame by frame, in a stop and go sequence past the display area 14 and back to the feed reel 22. Since the forward and reverse film advance means 26, 26a are the same, the detail description will be directed to the forward film advance means 26. The similar parts of the reverse film advance means 26a with respect to the forward film advance means 26, will be identified by the same numeral and also the suffix "a."

Figure 6:
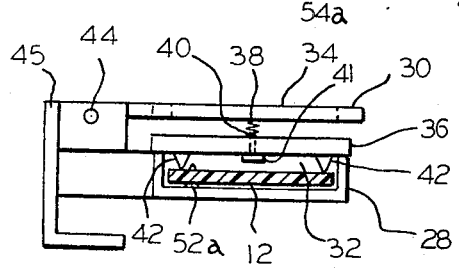
FIG. 6 is an enlarged sectional view taken on the plane of the line 6—6 in FIG. 4, and viewed in the direction indicated, and showing the fixed plate and pressure plate with the film therebetween.
Figure 5:
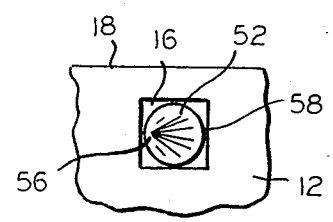
FIG. 5 is an enlarged fragmentary top view to illustrate an inhibit tooth engaged inside a perforation of the film.
Figure 7:
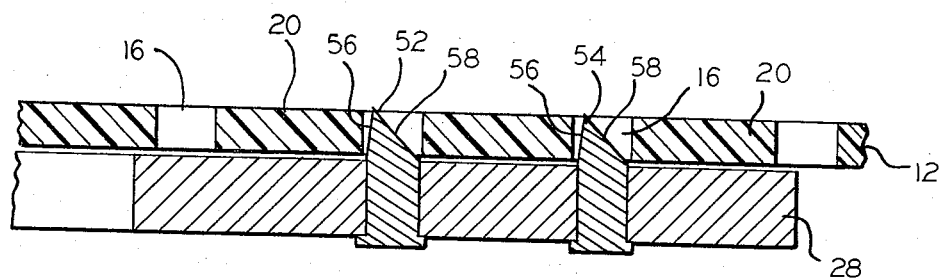
FIG. 7 is a fragmentary enlarged sectional view of a pair of film inhibit teeth and guide plate, to illustrate the teeth preventing forward movement of the film.
Figure 8:
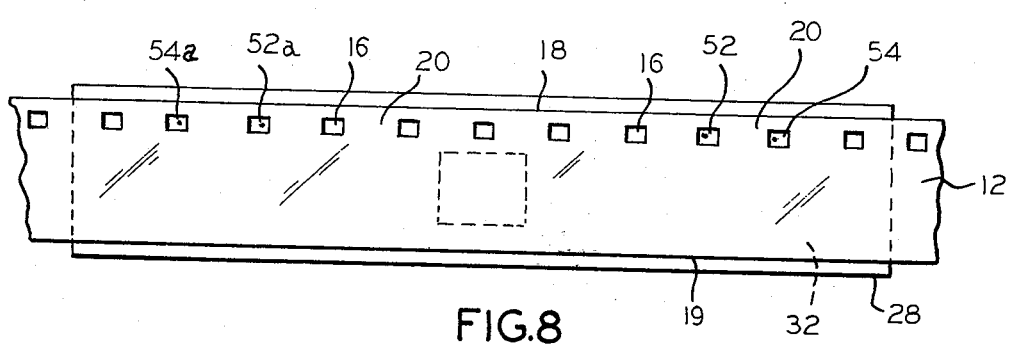
FIG. 8 is a fragmentary top view with the pressure plate removed, to illustrate the film engaged in the forward and reverse teeth.
Figure 9:
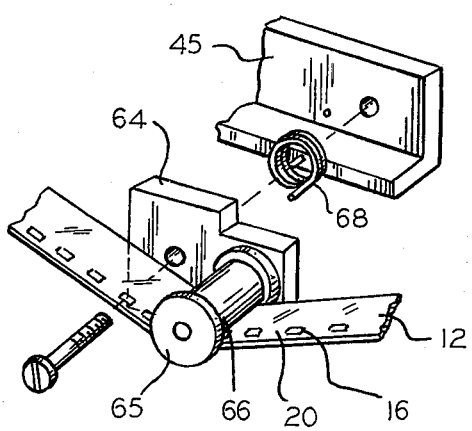
FIG. 9 is a perspective view of the pivotal arm.

The film 12 passes between a fixed guide plate 28 and a pressure plate means 30. As may be seen in FIG. 6, guide plate 28 has a channel 32 for receiving the film 12. The pressure plate means 30 includes an upper plate 34 and a lower plate 36 movably secured to the upper plate 34.

A pair of screws 38 extend through the lower plate 36 and threadedly attached to the upper plate 34. Springs 40 are positioned around screws 38 and resiliently force the lower plate 36 downward away from the upper plate 34 and against the heads 41 of the screws 38.

The lower plate 36 includes a pair of spaced apart front and rear feet 42, which extend downward for contacting the front and rear longitudinal edges of the film. The upper plate 34 is hinged at the rear edge along a pin 44. (FIG. 6) thereof to a rear mounting wall 45, and pivots between an open position and a closed position. The feet 42 of the lower plate are in contact with the film 12 at the display area 14, when upper plate 34 is in the closed-position. The film 12 in movement away from the display area 14 may cause the feet 42 of the lower plate 36 to lift up toward the upper plate 34, against the resilient force of springs 40, which minimizes any wearing of the film due to friction. The springs 40 return the feet 42 to their original downward position.

The display area 14 for the film frame is the area between the plates 28, 30 which is in alignment with the cut-out 46 in the plate 28 and cut-outs 47 and 48 respectively in the lower plate 36 and upper plate 34. A high intensity lamp 50, positioned underneath plate 28 beams its light through the cutouts 46, 47 and 48. A mirror or plurality of mirrors (not shown) are positioned above the plate means 30 to direct the picture image to the receiving surface 15.

A pair of spaced apart forward inhibit teeth 52, 54 are rigidly mounted inside channel 32 of the guide plate 28 in the path of film movement. The teeth 52, 54 are positioned to engage consecutive perforations 16 of the film, after the film has past the display area 14 when the film is moving in the forward direction. The reverse inhibit teeth 52a, 54a function in the same manner as the forward teeth 52, 54 when the film moves in the reverse direction, as will be further discussed below.

The teeth 52, 54 each have a steep side 56 and a sloping side 58. The steep sides 56 of teeth 52, 54 prevent film movement during engagement with the film when the film moves in the forward direction. The sloping sides 58 of the teeth 52, 54 offer virtually no resistance when the film moves in the reverse direction.

A sprocket 60 spaced forward of the inhibit teeth 52, 54 with respect to the forward movement of the film, revolves around its own axis to move the film toward the take-up reel 24. The sprocket 60 includes teeth 62 fixedly mounted around the periphery thereof to engage and dis-engage from the film perforations 16, as the sprocket 60 rotates.

A control arm 64 includes an outer end 65 having a roller 66 attached thereto which contacts the film 12. The inner end 67 of the arm 64 is pivotally attached to mounting wall 45 where it pivots around a fixed point. The roller 66 contacts the film 12 between the inhibit tooth 54 and sprocket 60 and extends across the width of the film.

Figure 2:
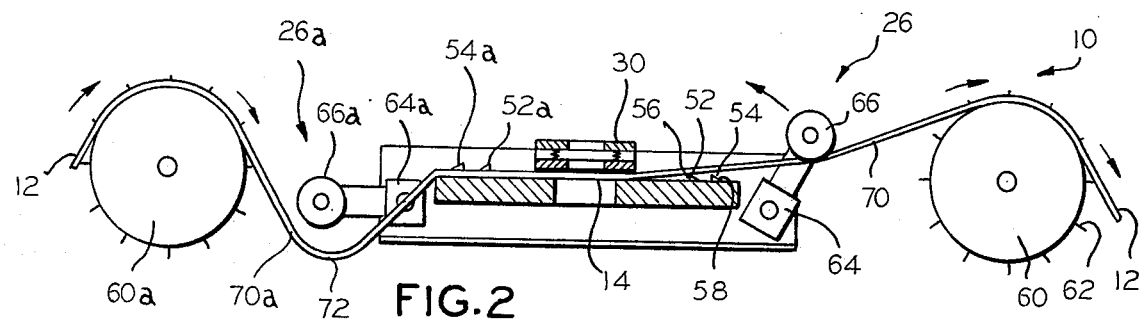
FIG. 2 is a diagramatic view similar to FIG. 1, and showing the film being released for advancing the next picture frame in the forward direction to the display area.

A spring 68 resiliently forces the arm 64 toward a normal or start-position as shown in FIG. 1. In the start-position, the teeth 52, 54 extend within a pair of perforations 16 and prevent forward film movement. As the film 12 rotates around sprocket 60 in the forward direction, the film segment 70 between sprocket 60 and inhibit tooth 54, builds up in tension. This increased tension removes the slack in segment 70 and causes the arm 64 to pivot from the start-position (FIG. 1) toward a film release-position (FIG. 2).

Figure 3:
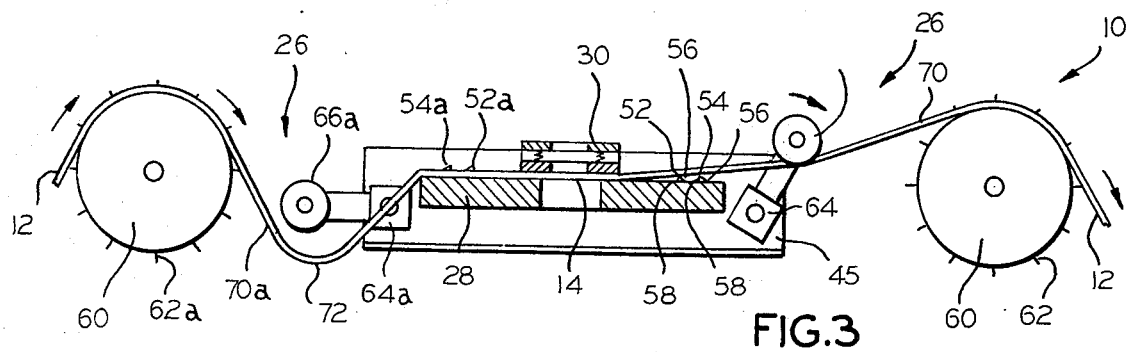
FIG. 3 is a diagramatic view similar to FIG. 1 and showing the film just prior to being locked in place across the display area.

When the arm 64 reaches the film release-position (FIG. 2), the film is lifted out of engagement with the teeth 52, 54 and is moved forward. The tension in the film segment 70 is now removed and segment 70 becomes slack. When this occurs, the arm 64, under the resilient force of spring 68, is forced back toward its start-position (FIG. 3). When arm 64 reaches the start-position, (FIG. 1) the film is positioned into channel 32 of the guide plate 28, so that the perforation 16 which was previously engaged with tooth 52 is now engaged with tooth 54, and the next trailing perforation 16 is engaged with tooth 52. The film is now advanced one frame and the film frame at the display area 14 is registered in place by the forward locking action of teeth 52, 54. The tension in segment 70 again begins to build-up, and the cycle automatically starts repeating.

When the film is moving in the forward direction, the control means 26a has no effect in the frame by frame advance of the film across the display area 14. Since no tension is developed in segment 70a, the arm 64a remains in the normal-position, as shown in FIGS. 1, 2 and 3. Due to the continuous feeding of film 12, and the stopping of each film frame prior to moving away from the display area 14, a loop 72 in the film is developed underneath the roller 66a of control arm 64a, as also shown in FIGS. 1, 2 and 3. Thus, the film 12 during movement in the forward direction (except possibly for the first few frames) does not contact the roller 66a. Therefore, the arm 64a cannot cause any restraining action when the film is moving in the forward direction.

Conversely, when the film 12 is moving in the reverse direction, a loop 74 is developed underneath the roller 66 of arm 64. Therefore, the film does not contact roller 66 and hence for reverse movement, control means 26 has no effect on the frame by frame advance of the film across the display area 14.

When the film is moving in the forward direction, the reverse inhibit teeth 52a, 54a engage the film within perforations 16, but do not impede forward film movement. The film approaches the teeth 52a, 54a from their sloping sides 58a, so the film easily slides over the teeth 52a, 54a, as the film is advanced frame by frame in the forward direction by control means 26.

When the film is moving in the reverse direction, the forward inhibit teeth 52, 54 engage the film within perforations 16, but do not impeded reverse film movement. The film approaches the teeth 52, 54 from their sloping sides 58, so the film easily slides over the teeth 52, 54, as the film is advanced frame by frame in the reverse direction by control means 26a.

The subject invention provides positive means for registering the frame in place prior to display. Since the frame is locked over the display area by the teeth 52, 54 for forward film movement, and teeth 52a, 54a for reverse film movement, part of one frame and part of another frame cannot be simultanesouly displayed.

To increase the rate of projecting the film frames per unit of time, only the film speed is required to be increased. When increasing the film speed, by, for example, increasing the rotational speed of the sprocket 60, the increment of time that the film frame stops at the display area is decreased. This is due to the decrease in the time required to sufficiently buildup the tension in segment 70, for releasing the film from the inhibit teeth 52, 54. Conversely, the build-up of tension would take a longer time, if the film speed is decreased by, for example, reducing the rotational speed of sprocket 60.

As also may be noted from FIGS. 1 thru 3, after the film is registered in place by the inhibit teeth 52, 54, the sprocket 60 continues to rotate clockwise, causing the film segment 70 to move angularly upward. This in turn, forces the arm 64 to pivot counter-clockwise until the film is lifted out of engagement with the inhibit teeth 52, 54.

In the embodiment described herein, each frame stops at the display area prior to passing and permitting the next frame to be projected. However, the system 10 could be adapted to provide an intermittent operation, whereby several frames pass until a frame is required to stop.

The foregoing specification and description are intended as illustrative of the invention, the scope of which is defined in the following claims.

I claim:

1. In a film transport system for advancing picture film past a picture display area including power means for moving the film in a path between two points, and control means for advancing the film in a stop and go sequence, whereby during each sequence a different portion of film stops at the display area, said control means comprising:
   means responsive to pressure of said film, for causing said different portion of film to advance after stopping at the display area.

2. The control means of claim 1, includes:
inhibit means for engaging said film during each said sequence and preventing movement of said portion of film at the display area.

3. In a film transport system for advancing picture film past a picture display area including power means for moving the film in a path between two points, and control means for advancing the film in a stop and go sequence, whereby during each sequence a different portion of film stops at the display area, said film having perforations spaced apart adjacent a longitudinal edge thereof, said control means comprising:
   a film inhibit tooth for engaging said film inside one of said perforations for preventing movement of said portion of film at said display area; and
   means responsive to pressure of said film, for causing said film to disengage from said tooth.

4. The control means of claim 3, wherein said tooth prevents movement of film in one direction and offers substantially no inhibiting force when the film moves in the opposite direction.

5. The control means of claim 3, wherein said tooth is located in a fixed position in said film path.

6. The control means of claim 5 includes means for lifting the film away from the tooth, for dis-engaging the film from the tooth.

7. The control means of claim 4, wherein said tooth includes:
   a film inhibit side for contacting the film and preventing movement when the film moves in said one direction; and
   a non-inhibit side for contacting the film without inhibiting the movement of the film when the film moves in said opposite direction.

8. The control means of claim 7, wherein said inhibit side of the tooth is substantially steeper in slope than said non-inhibit side.

9. In a film transport system for advancing picture film past a picture display area including power means for moving the film in a path between two points, and control means for advancing the film in a stop and go sequence, whereby during each sequence a different portion of film stops at the display area, said control means comprising:
   a control arm for contacting said moving film, said arm pivoting from a start-position to a film release-position in response to the pressure of said film after said portion has stopped at the display area, said film portion moving away from the display area after the arm has reached the film release-position.

10. The control means of claim 9, includes:
spring means associated with said arm, said film pressure causing said arm to move against the force of said spring, said spring causing said arm to return to said start-position after the arm has reached said film release-position and said pressure has decreased.

11. The control means of claim 1, comprises:
tension means for generating said pressure by causing a tension in the film, after said film portion has stopped at said display area.

12. The control means of claim 11, wherein said tension means includes:
   a sprocket around which said film rotates, said sprocket being positioned to receive the film after passing the display area, said sprocket rotating to cause said tension after said film portion has stopped at the display area.

13. The control means of claim 9 further includes:

a sprocket positioned near said arm, said film moving around the sprocket to develope said pressure after said portion of film has stopped at the display area, said arm pivoting from said start to said release-position when said pressure is being developed.

14. The transport means of claim 13 further includes:
inhibit means for engaging the film and preventing movement of said film portion, said tension in the film being caused in the film segment between the sprocket and said inhibit means, the film being disengaged from said inhibit means when the arm reaches said release-position, said film contacting the control arm being slack after the film has disengaged from the inhibit means, to enable the arm to return to said start-position.

15. The film transport means of claim 14 wherein said film includes perforations formed therein and said inhibit means includes a tooth for engaging the film inside one of the perforations, said film being lifted away from said tooth after said arm reaches said release-position.

16. In a film transport system for advancing picture film past a picture display area including power means for moving the film in a path between two points and control means for advancing the film in a stop and go sequence, whereby during each sequence a different portion of the film stops at display area, said control means comprising:
a forward means responsive to pressure of said film, for causing said portion of film to advance in the forward direction after stopping at the display area; and
a reverse means responsive to pressure of said film for causing said different portion of film to advance in the reverse direction after stopping at the display area.

17. The film transport means of claim 16 wherein said first mentioned control means is positioned in the path of film movement on one side of the display area and said second control means is positioned in the path of film movement on the opposite side of the display area.

18. The film transport means of claim 17, wherein said first control means includes a forward tooth for preventing film movement in the forward direction, and said second control means includes a reverse tooth for preventing film movement in the reverse direction.

19. The film transport means of claim 18 wherein said first control means includes a control arm for contacting said film and pivoting from a start-position to a film release-position in response to said film pressure, after said film portion has stopped at said display area when the film moves in the forward direction; and
said second control means includes a control arm for contacting said moving film and pivoting from a start-position to a film release-position in response to said film pressure, after said film portion has stopped at said display area when the film moves in the reverse direction.

20. A method for advancing picture film across a display area comprising the steps of:
continuously moving film in one direction from a first point to a second point, said display area being located between said two points;
stopping a portion of said moving film across said display area;
generating an increasing tension force in said film after said portion has stopped at the display area; and
advancing said portion of film after said tension force has sufficiently increased.

21. The method of claim 20 includes:
locking said portion of film across said display area; and
releasing said locked portion after said tension has sufficiently increased.

22. The method of claim 21 includes:
removing said tension force; and
locking said next portion of film after said tension force is removed.

23. The method of claim 20 wherein said tension is increased in the segment of film that has passed said display area with respect to the film moving in said one direction.

24. The method of claim 21 includes:
reversing the direction of film movement;
locking a portion of said reverse moving film across the display area;
generating an increasing tension force in said reverse moving film after said portion has stopped at the display area; and
advancing said portion of the reverse moving film in the reverse direction, after said tension has sufficiently increased.

25. The method of claim 20 includes:
increasing the speed of film travel between said two points, for decreasing the time duration said portion of film stops at said display area.

26. The method of claim 20 includes:
decreasing the speed of film travel between said two points for increasing the time duration said portion of film stops at said display area.

27. The method of claim 20 includes:
increasing the frame of the film projected per unit of time by increasing the speed of film movement between said two points.

28. In a film transport means for moving picture film past a display area including power means for moving film in a path between a feed point and a receiving point, said display area being positioned in said path, and a control means for advancing the film across the display area and a portion of the film stops at the display area, said control means comprising:
means for generating tension in the film after said portion has stopped at the display area; and
means responsive to said tension for advancing said portion of film after said tension has sufficiently increased.

29. The control means of claim 28, wherein said tension generating means cooperating with said power means, whereby the time duration for generating said sufficient increase in tension being dependent upon the rate of movement of said film from said feed point toward said receive point.

30. In a film transport means for moving picture film past a display area including power means for moving film in a path between a feed point and a receive point, said display area being positioned in said path, and a control means for advancing the film across the display area and a portion of said film stops at the display area, said control means comprising:

means for angularly moving a film segment located between the display area and said receive point, after said portion has stopped at the display area; and means responsive to said angular movement to cause said portion of film to advance toward said receive point.

31. The film transport means of claim 30, wherein said means for angularly moving said film segment co-operating with said power means, whereby the time duration for angularly moving said segment to cause said advance of the film is dependent upon the rate of movement of said film from said feed point toward said receive point.

* * * * *